United States Patent [19]
Johnson

[11] 3,915,056
[45] Oct. 28, 1975

[54] WASHER FOR TRANSMISSION LINE SUPPORT MEMBER
[75] Inventor: William B. Johnson, Birmingham, Ala.
[73] Assignee: Bethea Company, Inc., Birmingham, Ala.
[22] Filed: Nov. 15, 1973
[21] Appl. No.: 416,048

[52] U.S. Cl. .............................. 85/50 R; 164/350
[51] Int. Cl.² .......................................... F16B 43/00
[58] Field of Search ........ 85/50 R; 151/38; 248/221

[56] References Cited
UNITED STATES PATENTS

| | | | |
|---|---|---|---|
| 320,638 | 6/1885 | Davies | 85/50 R |
| 1,016,797 | 2/1912 | Thomson et al. | 151/38 |
| 1,016,798 | 2/1912 | Thomson et al. | 151/38 |
| 1,193,699 | 8/1916 | Keen | 85/50 R |
| 2,120,462 | 6/1938 | Ferguson | 85/50 R |
| 2,247,959 | 7/1941 | McComb | 151/38 |
| 2,969,859 | 1/1961 | Huggins | 248/221 |
| 3,408,028 | 10/1968 | Raymond | 248/221 |

Primary Examiner—Edward C. Allen
Attorney, Agent, or Firm—Woodford R. Thompson, Jr.

[57] ABSTRACT

A washer for attaching a bolt to a wood support for transmission lines. The washer embodies a plate-like body having a bolt hole therethrough. Opposite sides of the body taper from a line extending through the opening toward oppositely disposed edges to provide a thicker seating area adjacent the hole which engages the support member upon initial application of force with the seating area progressively increasing outwardly in response to increases in force applied. The washers are formed from a pattern of a plurality of upstanding washers in edge to edge contact.

1 Claim, 8 Drawing Figures

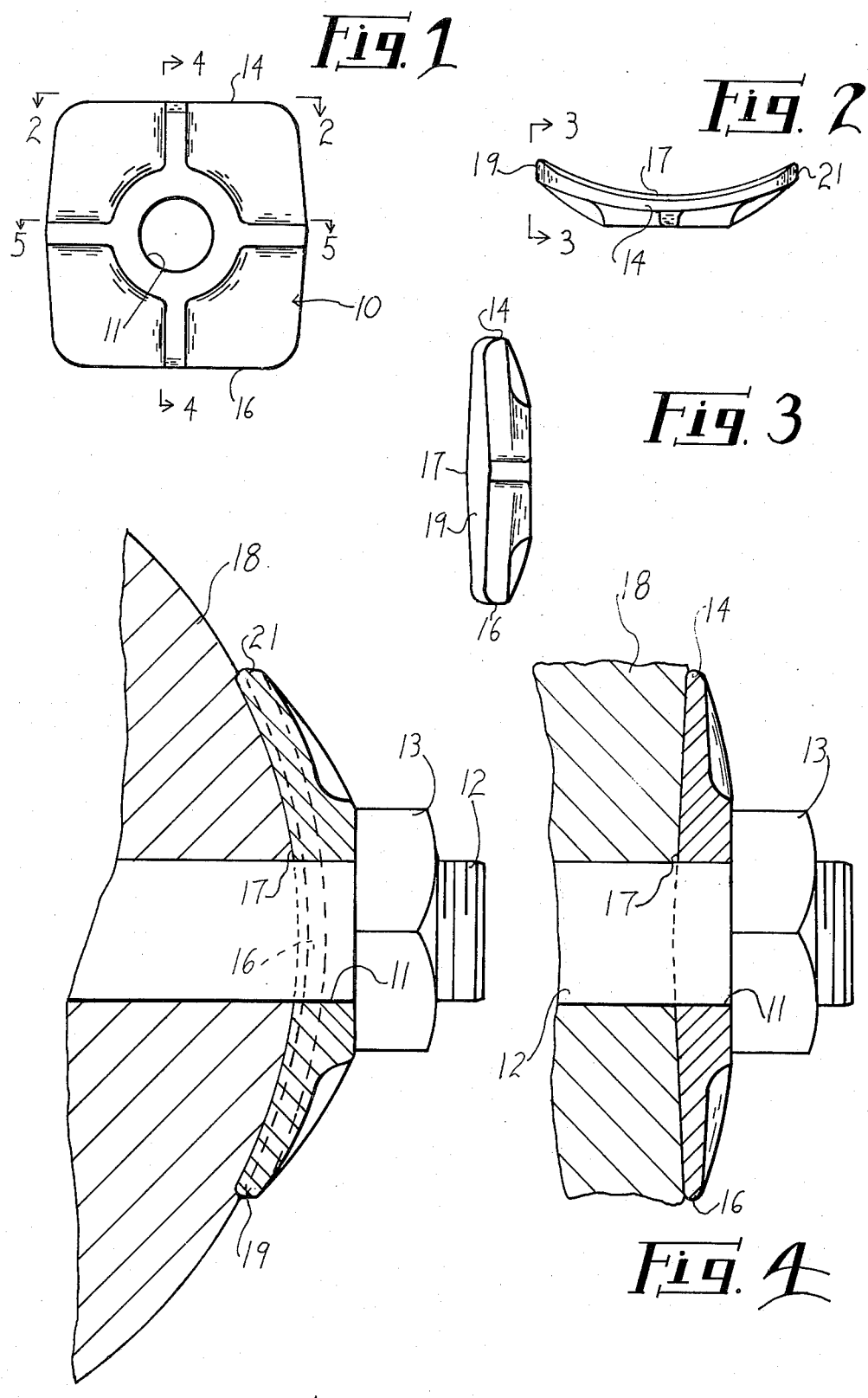

WASHER FOR TRANSMISSION LINE SUPPORT MEMBER

BACKGROUND OF THE INVENTION

This invention relates to a washer for attaching a bolt-like member to a wood support member for transmission lines.

Heretofore in the art to which my invention relates, difficulties have been encountered in designing washers for attaching bolt-like members to wood support members for transmission lines and the like due to the fact that most washers are designed of a specific radius whereby they actually fit supporting poles which have a curved outer surface corresponding to the curvature of the washer. Accordingly, for a small diameter pole there would be line contact adjacent the center of the washer whereby the fibers of the pole would be broken or sheared at the upper and lower edges of the washer. On the other hand, where a large pole is employed, conventional washers would produce a line contact at opposite edges of the washer whereby there would be a breaking or shearing of the fibers along the side edges of the washer. This breakage or shearing of the fibers not only damages the pole but facilitates the penetration of water into broken or sheared edges thus causing age deterioration around the bolt hole.

Heretofore, the formation of pole washers has been a very slow process due to the fact that the washers have been formed from patters which lie flat in a horizontal plane due to the fact that conventional pole washers could not be formed in an upright position. That is, since conventional pole washers have a cylindrical inner surface, the required draft is not present.

BRIEF SUMMARY OF THE INVENTION

In accordance with my invention, I provide a washer for attaching a bolt-like member to a wood support member for transmission lines and the like wherein opposite sides of the washer body taper from a line extending through the bolt opening toward opposite disposed edge portions to provide a thicker seating area adjacent the bolt hole which engages the support member upon initial application of force with the seating area progressively increasing outwardly of the hole in response to increases in force applied. Accordingly, compression of the fibers of the support member is greater adjacent the opening and progressively decreases uniformly outwardly toward the outer edges of the washer. My improved washer is thus adapted for use on poles which vary in diameter due to the fact that I provide a conical taper from a line extending horizontally through the bolt hole instead of a cylindrical inner surface, which is provided on conventional type pole washers. Where a flat support member is employed, my improved washer has two tapered, flat surfaces which taper from a line passing through the bolt hole. My improved washers are formed from a pattern of a plurality of upstanding inner connected washers in edge to edge contact to form passageways in the mold for through feed of molten metal. Accordingly, a plurality of washers are formed at the same time, thus greatly reducing the labor and apparatus required and at the same time increasing the rate of production of the washers.

DESCRIPTION OF DRAWINGS

Washers embodying features of my invention and apparatus which may be employed to form the washers are illustrated in the accompanying drawings, forming a part of this application, in which:

FIG. 1 is a side elevational view of my improved washer showing the side thereof opposite the side which engages a pole;

FIG. 2 is a top plan view taken generally along the line 2—2 of FIG. 1;

FIG. 3 is an end view taken generally along the line 3—3 of FIG. 2;

FIg. 4 is an enlarged, fragmental, sectional view taken generally along the line 4—4 of FIG. 1 showing the washer attached to a pole by a bolt-like member.

FIG. 5 is an enlarged, fragmental, sectional view taken generally along the line 5—5 of FIG. 1 showing the washer attached to a pole;

Referring now to FIGS. 1 through 5 of the drawings, I show my improved washer as being of the curved type adapted to accommodate the outer surface of a generally round pole. The washer comprises a plate-like body 10 having a hole 11 therethrough for receiving a bolt-like member 12. The bolt-like member 12 is secured in place by the usual nut 13, as shown in FIGS. 4 and 5. As clearly shown in FIG. 4, opposite sides of the body 10 taper from a line extending through the opening 11 toward oppositely disposed edge portions 14 and 16 at the upper and lower ends of the body 10, respectively. Accordingly, a thicker seating area 17 is provided adjacent said lines along which the body member tapers with the thicker seating area engaging the support member, indicated at 18, upon initial application of force against the body member 10. The seating area progressively increases outwardly of the hole in response to increases in force applied whereby compression of the fibers of the support member 17 is greater adjacent the opening and progressively decreases in a uniform manner outwardly toward the edge portions 14 and 16. As shown in FIGS. 2, 3 and 5, the thicker seating area 17 extends transversely the entire width of the body 10 to the side edges 19 and 21. It will thus be seen that my improved washer is provided with a conical taper instead of having the usual cylindrical surface. Accordingly, my improved curved washer is provided with a large radius arc at the upper and lower edges 14 and 16 and a smaller radius arc adjacent the center along the thicker seating area 17.

Referring now to FIG. 6 of the drawing, I show a modified form of my invention in which a washer 10a is provided with a flat body instead of a curved body, as shown in FIGS. 1 through 5. That is, the washer 10a is adapted to engage supporting structures having flat contact surfaces. It will thus be seen that washer 10a is provided with a thicker seating area 17a which corresponds to the thicker seating area 17 of the embodiment shown in FIGS. 1 through 5. The thicker seating area 17a is defined by opposite sides of the body 10a tapering from a line extending through the bolt opening toward oppositely disposed edge portions of the washer body, as described hereinabove. Accordingly, a vertical sectional view through FIG. 6 would correspond generally to the structure shown in FIG. 4. As shown in dotted lines in FIG. 6, the lower edge 16a of the washer 10a is much thinner than the thicker seating area 17a. The supporting structure, indicated at 18a, may be in the form of a pole or cross member generally rectangular, as viewed in cross section.

Referring now to FIGS. 7 and 8 of the drawings, I show a pattern 22 of a plurality of upstanding, interconnected washer bodies 10b. The washer bodies in the pattern 22 are in edge to edge contact with each other to form passageways in a mold for passing molten metal whereby there is through flow of metal from one cavity to another, thus eliminating the necessity of providing separate passageways for introducing molten metal for the formation of each washer body.

Figure 7:
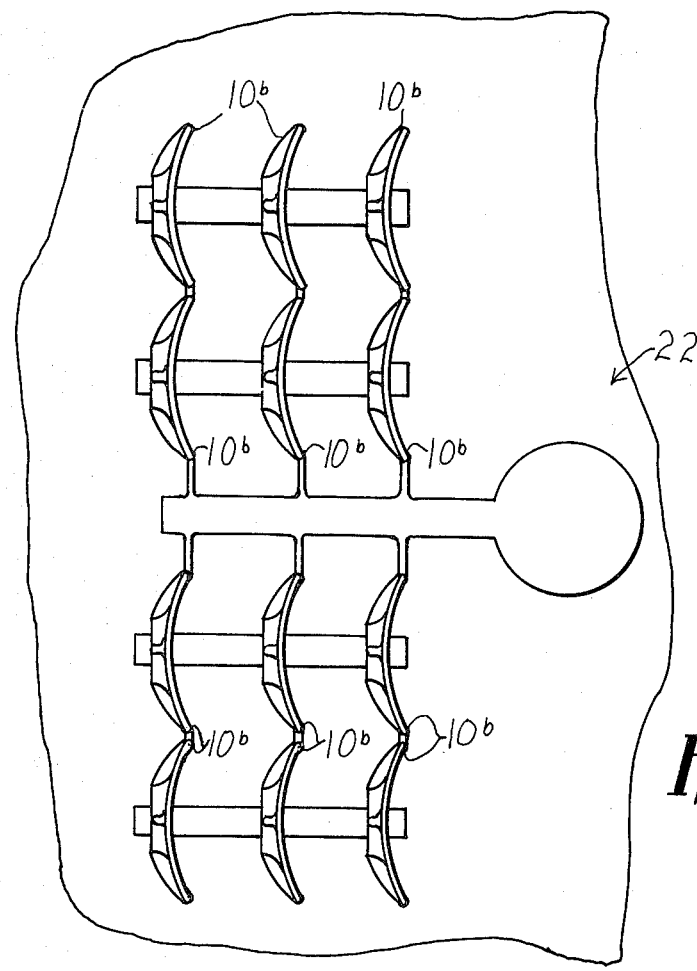
FIG. 7 is a fragmental, plan view showing a portion of a pattern which may be employed to form my improved washers.
Figure 6:
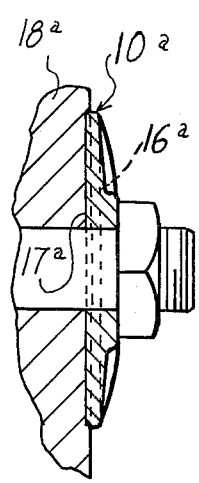
FIG. 6 is a sectional view corresponding to FIG. 5, drawn to a smaller scale and showing the inner surface of the washer as being relatively flat instead of being curved, as shown in FIGS. 1 through 5.
Figure 8:
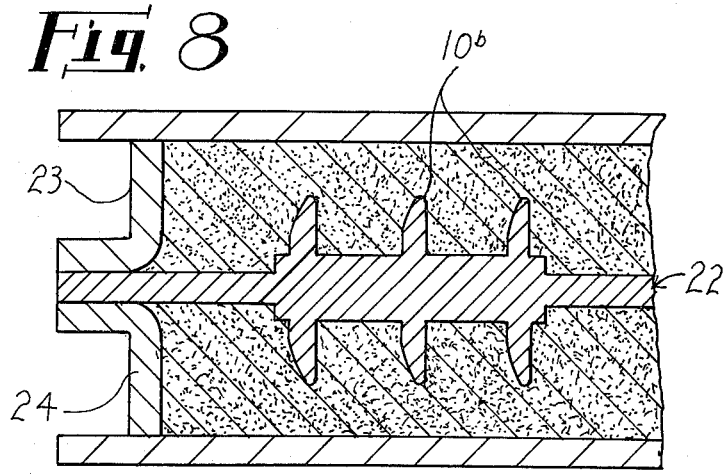
FIG. 8 is a fragmenal sectional view taken through a mold assembly having the pattern shown in FIG. 7 in place therein.

The pattern 22 is positioned between the top flask 23 and the bottom flask 24, as shown in FIG. 8 and sand or other suitable mold forming material is packed around the pattern 22 to form cavities in the upper and lower sections of the mold. The pattern 22 is removed and the two sections of the mold are then assembled in a conventional manner for receiving molten metal whereby a plurality of the washers 10 are cast at a time.

From the foregoing, it will be seen that I have devised an improved washer for attaching a bolt or the like to a wood support member for transmission lines and the like. By tapering opposite sides of the body member from a line extending through the bolt opening toward oppositely disposed edge portions of the body, a thicker seating area is provided which engages the support member upon initial application of force with the seating area progressively increasing outwardly of the hole in response to increases in force applied. Accordingly, compression of the fibers of the support member is greater adjacent the opening and progressively decrease in a uniform manner outwardly toward the oppositely disposed edges thus providing a compact shield around the hole which prevents the entry of water into the fibers of the support member and greatly reduces age deterioration. Also, by providing the thicker seating area along a line extending through the opening, the wood fibers are bent in a general manner instead of being sheared or broken by engagement of a sharp edge of the washer with the support member. Furthermore, by forming a plurality of upstanding washers each time molten metal is poured into the mold, I not only reduce the labor and equipment required but also greatly increase the rate of production.

While I have shown my invention in but two forms, it will be obvious to those skilled in the art that it is not so limited, but is susceptible of various other changes and modifications without departing from the spirit thereof.

What I claim is:

1. In a washer for attaching a bolt-like member to a generally round wood support member having compressible fibers for transmission lines and the like:

a. a plate-like body member having a concave surface defining a portion of a cylinder at one side thereof for engaging said support member and having a hole therethrough for receiving a bolt-like member, and (b) opposite portions of said body member at said one side having a conical taper from a line extending transversely through said portion of a cylinder and said opening toward oppositely disposed end portions of said portion of a cylinder, providing a thicker seating area adjacent said line which engages the support member upon initial application of force against said body member with the seating area progressively increasing outwardly of said hole in response to increases in force applied so that compression of the fibers of the support member is greater adjacent said opening and progressively decreases uniformly outwardly toward said end portions.

* * * * *